No. 784,011. PATENTED FEB. 28, 1905.
A. M. SHEAKLEY.
BALE OR CRATE.
APPLICATION FILED FEB. 3, 1904.
2 SHEETS—SHEET 2.
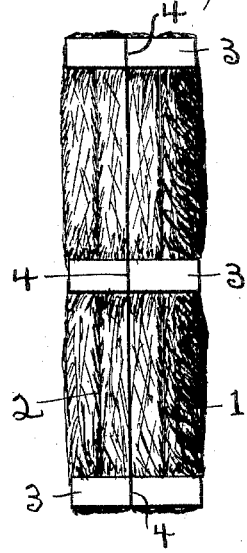
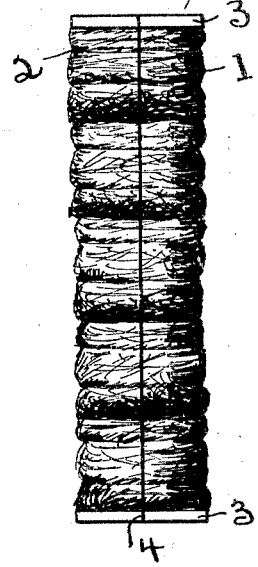
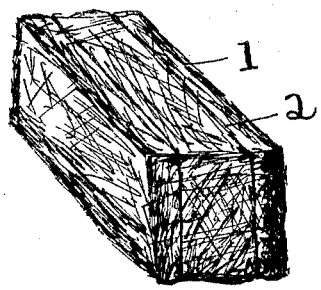
Witnesses
Percy S. Webster.
Lena Williams.
Inventor
Arthur M. Sheakley
By Joshua B. Webster
Attorney No. 784,011. Patented February 28, 1905.

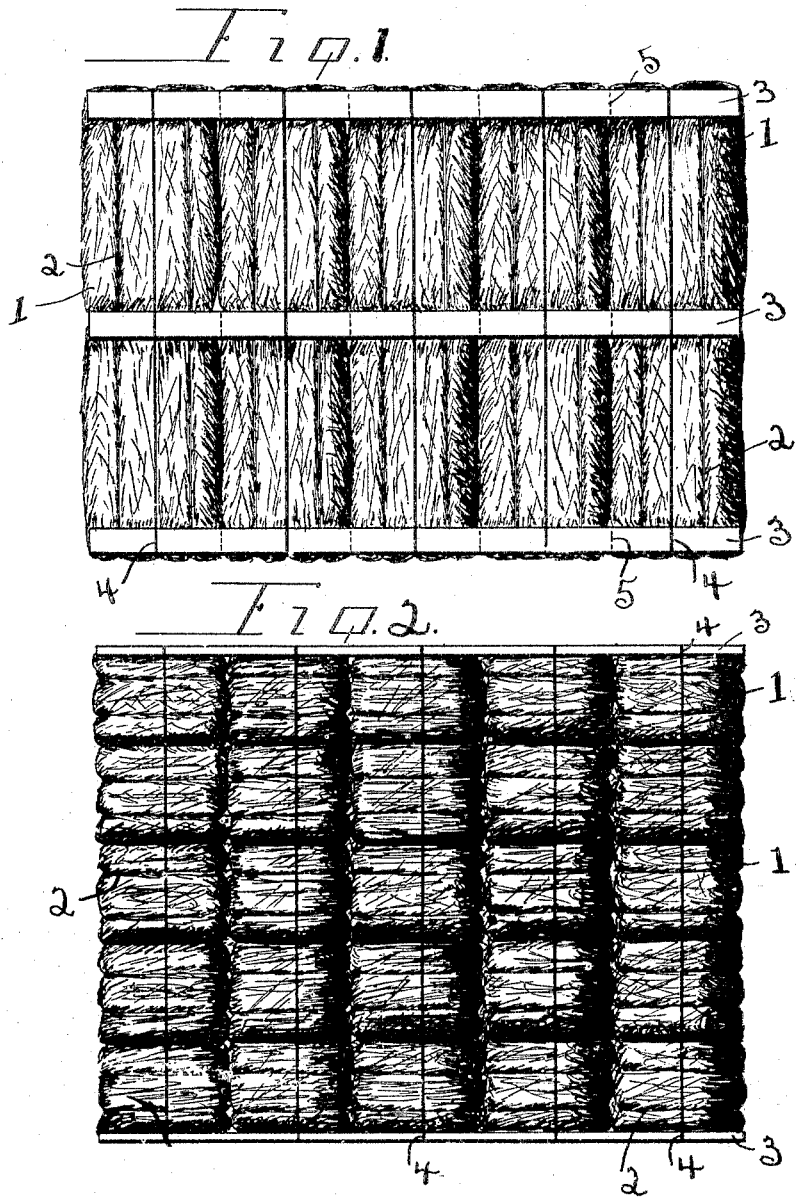

UNITED STATES PATENT OFFICE.

ARTHUR M. SHEAKLEY, OF STOCKTON, CALIFORNIA, ASSIGNOR TO HERCULES MFG. COMPANY, OF STOCKTON, CALIFORNIA, A CORPORATION.

BALE OR CRATE.

SPECIFICATION forming part of Letters Patent No. 784,011, dated February 28, 1905.

Application filed February 3, 1904. Serial No. 191,793.

*To all whom it may concern:*

Be it known that I, ARTHUR M. SHEAKLEY, a citizen of the United States, residing at Stockton, in the county of San Joaquin and State of California, have invented certain new and useful Improvements in Bales or Crates; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in bales or crates for fiber used in plaster; and my object is to produce a bale-tie for the same in which it may be compactly pressed and easily handled for wholesale or retail trade. This object I accomplish by the peculiar construction and adaptation of parts hereinafter described, and particularly pointed out in the claims appended.

Referring to the drawings, Figure 1 is a top plan view of one of my improved crates of baled fiber. Fig. 2 is a side elevation of the same. Fig. 3 is a top plan view of a section of said crated fiber. Fig. 4 is a side elevation of another section. Fig. 5 designates a single bale of the fiber.

The fiber which is formed into bales is that made, preferably, of Manila hemp and is used in the making of plaster in preference to hair. By experience I have found that it requires about four pounds of said fiber to one barrel of lime. Hence I first weigh out four pounds of the fiber and by any suitable means press such amount together, forming the bale 1. I then secure this bale in its proper shape by means of strings 2. I then lay on the follower of a suitable pressing-machine three slats 3 at a distance apart equal to the length of one of the bales 1. These slats are in length equal to five times the width of one of said bales. The bales 1 are then piled on said slats in five sections of ten each—viz., two wide and five high, as shown by Figs. 1 and 2. On the top of this pile are laid three more slats in similar positions to those on the bottom. By means of the pressing-machine these bales are then pressed tightly together. Around each section I then secure suitable wires 4 and my fiber is bundled, ready for use. This bundle, as will be readily seen, contains fifty bales of four pounds each, divided into sections of ten bales each, the whole crate containing a sufficient amount for fifty barrels of lime. On the outer side of the slats 3 are perforations 5 at the points where the different sections come together. When it is desired by the trade to sell one section of a whole bundle, those perforations designate the points at which the slats must be sawed to separate said section from the rest, and similarly for two or more sections. Figs. 3 and 4 show the sections as they appear when sawed off.

Although for the sake of clearly describing my improved device I have given certain weights and measures, still I do not necessarily confine myself to such.

Any suitable bands may be used in place of the wires 4.

I have described in part the use of the baled fiber and the manner of bundling same, but make no claim to either of these features in this application, as they will be made the subject of a separate application.

I have entered into a detailed description of the relative construction and arrangement of parts as embraced in the present and preferred embodiment of my invention. I do not desire, however, to be understood as confining myself to such specific details, as such changes and modifications may be made in practice as fairly fall within the scope of my claims.

Having thus described my invention, what I claim as new and useful, and desire to secure by Letters Patent, is—

1. A composite bale of the type set forth, comprising bales each independently bound, a plurality of bales being laid end to end and piled in tiers, each tier constituting a section and a plurality of tiers being arranged side by side, slats arranged at the tops and bottoms and near the ends of the tiers and extending the length of all said tiers grouped as described, slats arranged at the centers of the tiers, said slats being arranged at the tops and at the bottoms of the tiers, means for retaining said slats in position, said slats being perforated at the junctures of the several tiers.

2. A composite bale of the type set forth, comprising a plurality of bales arranged in pairs with two bales of each pair end to end and with one pair on top of the other, constituting double tiers, a plurality of such tiers arranged side by side, slats arranged on the tops and on the bottoms of the tiers and wires surrounding each tier in alinement with the centers of the bales composing the tier, and perforations in said slats between the tiers.

3. A composite bale consisting of pairs of bales laid end to end, a plurality of said pairs laid one on top of the other, constituting tiers, a plurality of such tiers laid side by side, slats crossing all the tiers at each edge and the centers of the tiers and on the top and bottom of the same and wires passing lengthwise around each tier and over all the slats at the top and bottom of the composite bale.

In testimony whereof I have signed my name to this specification in the presence of two subscribing witnesses.

ARTHUR M. SHEAKLEY.

Witnesses:
  JOSHUA B. WEBSTER,
  PERCY S. WEBSTER.